(12) United States Patent
Onose (10) Patent No.: US 11,531,551 B2
(45) Date of Patent: Dec. 20, 2022

(54) PLC DEVICE THAT TRANSMITS AN INSTRUCTION TO A CONTROL DEVICE

(71) Applicant: FANUC CORPORATION, Yamanashi (JP)

(72) Inventor: Nao Onose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 181 days.

(21) Appl. No.: 16/898,936

(22) Filed: Jun. 11, 2020

(65) Prior Publication Data

US 2021/0011731 A1 Jan. 14, 2021

(30) Foreign Application Priority Data

Jul. 8, 2019 (JP) .............................. JP2019-126764

(51) Int. Cl.
*G06F 9/38* (2018.01)
*G05B 19/05* (2006.01)

(52) U.S. Cl.
CPC ........... *G06F 9/3855* (2013.01); *G05B 19/05* (2013.01); *G05B 2219/13116* (2013.01)

(58) Field of Classification Search
CPC ................................................... G06F 9/3855
See application file for complete search history.

(56) References Cited

U.S. PATENT DOCUMENTS

| | | | | |
|---|---|---|---|---|
| 2012/0126850 A1* | 5/2012 | Wasson | ................ | H03K 19/007 326/38 |
| 2017/0060759 A1* | 3/2017 | Guthrie | ............... | G06F 9/30043 |
| 2017/0075334 A1* | 3/2017 | Yaoita | .................... | G06F 9/4843 |
| 2019/0079499 A1* | 3/2019 | Yamamoto | ........... | G05B 19/056 |
| 2019/0095246 A1* | 3/2019 | Nakano | ................ | G05B 19/052 |
| 2019/0163487 A1* | 5/2019 | Sadasivam | ............ | G06F 9/3836 |
| 2019/0243684 A1* | 8/2019 | Roy | ....................... | G06F 9/3836 |

OTHER PUBLICATIONS

Yasuda, "When reading CNC information with WINDR and WINDW", https://www.pmcladder.info/pmc/19, Apr. 2009 (with English translation).

* cited by examiner

*Primary Examiner* — Michael J Metzger
(74) *Attorney, Agent, or Firm* — Wenderoth, Lind & Ponack, L.L.P.

(57) ABSTRACT

To preferentially execute an instruction with higher priority in a case of the CNC being unable to respond due to being an unresponsive timing, load on the bus or the like. A PLC device includes: a special instruction control unit that sets a priority degree indicating a degree of priority for executing predetermined processing to a special instruction for performing the predetermined processing in a control device that controls an industrial machine, and transmits the special instruction in which the priority degree is set to the control device; an instruction storage determining unit that determines whether or not to queue the special instruction according to an operation state of the control device; and an instruction storage unit that sequentially stores the special instruction received, on the basis of a determination result of the instruction storage determining unit.

3 Claims, 5 Drawing Sheets

PLC DEVICE THAT TRANSMITS AN INSTRUCTION TO A CONTROL DEVICE

This application is based on and claims the benefit of priority from Japanese Patent Application No. 2019-126764, filed on 8 Jul. 2019, the content of which is incorporated herein by reference.

BACKGROUND OF THE INVENTION

Field of the Invention

The present invention relates to a PLC device.

Related Art

With machine tools, machining of complicated shapes, etc. may be carried out on the basis of numerical control of the moving distance, the moving speed, etc. of a tool by CNC (Computerized Numerical Control) and PLC (Programmable Logic Controller). In this case, it may be desired for the PLC to write data such as the state of each axis of X, Y, and Z in the machine tool in the sequence control.

In this regard, a special instruction such as WINDW instruction is known in the PLC to write various data through windows between CNC and PLC. For example, see Non-Patent Document 1.

Non-Patent Document 1: "Reading CNC Information with WINDR and WINDW" (https://www.pmcladder.info/pmc/19))

SUMMARY OF THE INVENTION

Figure 1:
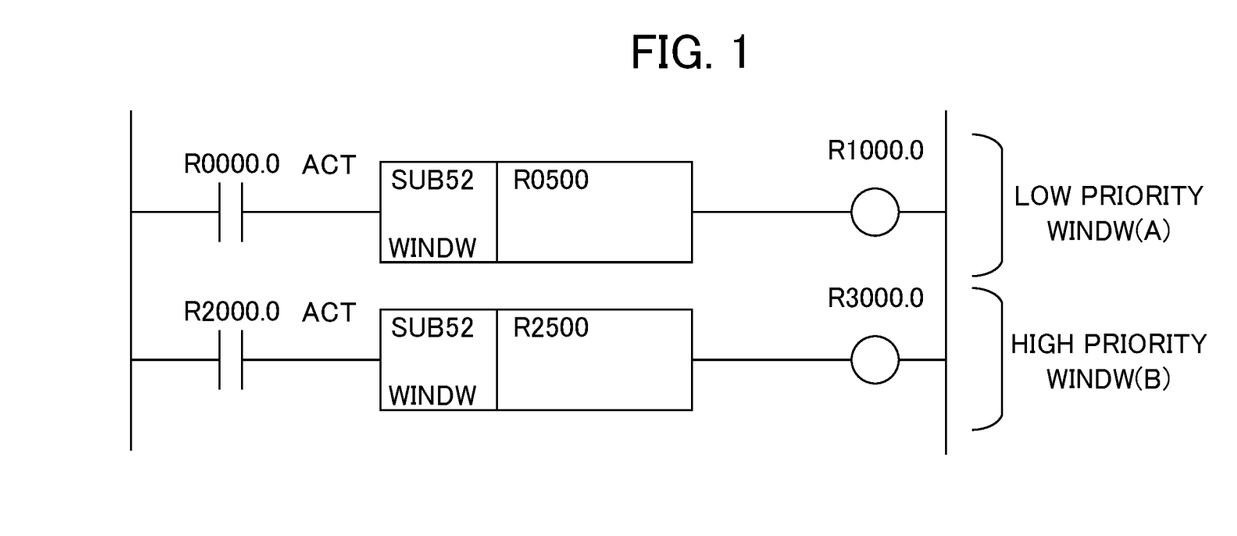
FIG. 1 is a diagram showing an example of a net number in which two WINDWs in a ladder program are coded.

FIG. 1 is a diagram illustrating an example of a net number in which the two of WINDW(A) and WINDW(B) in a ladder program are coded. It should be noted that WINDW (A) and WINDW(B) each show an instruction for writing different data from each other such as a tool offset amount and a workpiece origin offset amount.

In FIG. 1, for example, in the net number in which the low priority WINDW(A) is coded, the contact of the address R0000.0 which is a 1-bit value is the A contact. When the contact of the address R0000.0 is "1", the rung of the net number is executed. "ACT" indicates that the contact, of the address R0000.0 is the activation condition of the function instruction.

An element having the number of a "SUB52" function instruction indicates a WINDW special instruction. "R0500" of WINDW indicates the start address of the storage area where the data is stored.

The element of address R1000.0, which is a 1-bit value, is also referred to as a write coil. When the function instruction is completed, the value becomes "1".

It should be noted that the same applies to the net number in which the high priority WINDW(B) is coded.

In the ladder program shown in FIG. 1, after the processing of the WINDW(A) with the lower priority is completed, the processing of the WINDW(B) with the higher priority is executed.

Figure 2A:
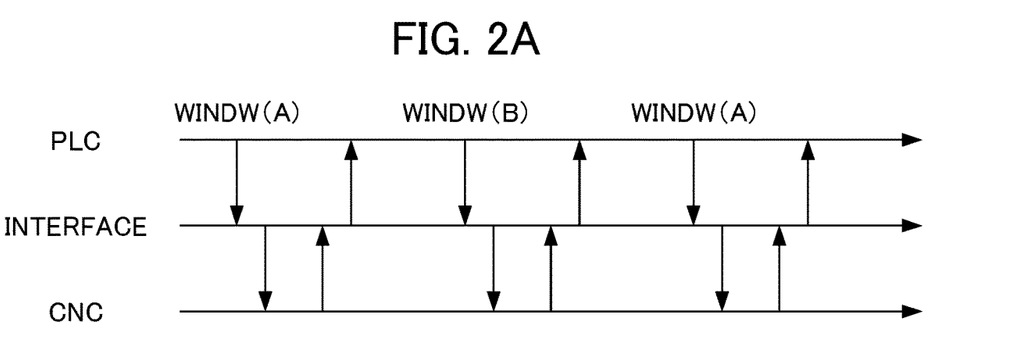
FIG. 2A is a diagram showing an example for explaining the communication between PLC and CNC in the normal state.

In other words, as shown in FIG. 2A, the PLC sequentially transmits each of the special instructions of the WINDW(A) and the WINDW (B) to the CNC via the interface at the desired timing when the CNC is in the normal state, and writes the data such as the tool offset amount in the CNC. It should be noted that the horizontal axis represents time in FIG. 2.

However, an interface that relays communication between the PLC and the CNC is often in the embedded-OS (Operating System) environment, and it may be exclusive for multiple executions of the same instruction. In addition, with the PLC, a timing exists at which it is desired to preferentially execute control by WINDW depending on various machining statuses; however, once the special instruction is executed, the execute permission is occupied until it is completed.

Figure 2B:
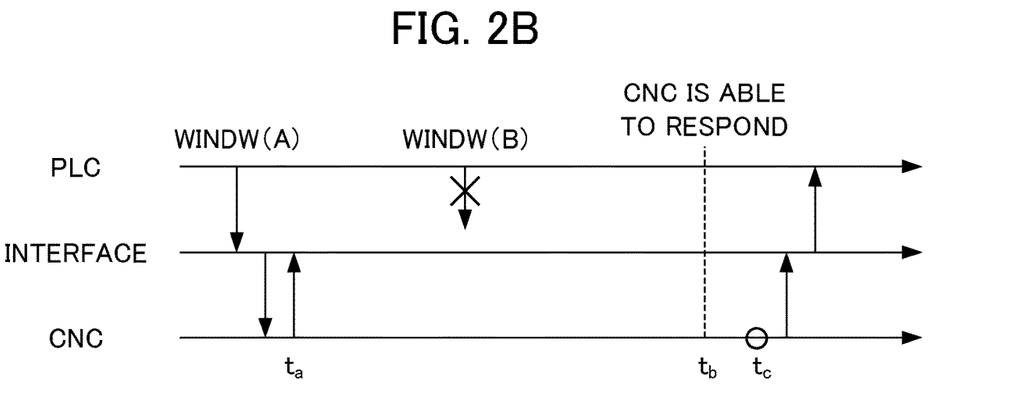

As shown in the FIG. 2B, in a case of the CNC being unable to respond due to being an unresponsive timing such as axis replacement, load on the bus or the like, the PLC may take a long execution time in the WINDW(A) having low priority that is not very important, and may not be able to execute the WINDW(B) having higher priority which was originally desired to be executed preferentially.

That is, in a case in which the PLC transmits the low priority WINDW(A) to the CNC and receives a notification indicating that the interface is unable to respond from the CNC at the time $t_a$ the PLC is unable to execute the WINDW(A) until the time $t_c$ after the time $t_b$ at which the CNC becomes able to respond. In this case, the WINDW(B) with the higher priority that was desired to be executed preferentially is executed at a later time.

Therefore, it has been desired to preferentially execute an instruction with higher priority in a case of the CNC being unable to respond due to being an unresponsive timing, load on the bus or the like.

A PLC device according to an aspect of the present disclosure includes: a special instruction control unit that sets a priority degree indicating a degree of priority for executing predetermined processing to a special instruction for performing the predetermined processing in a control device that controls an industrial machine, and transmits the special instruction in which the priority degree is set to the control device; an instruction storage determining unit that determines whether or not to queue the special instruction according to an operation state of the control device; and an instruction storage unit that sequentially stores the special instruction received, on the basis of a determination result of the instruction storage determining unit.

According to one aspect, in a case of the CNC being unable to respond due to being an unresponsive timing, load on the bus or the like, a highly priority instruction can be preferentially executed.

BRIEF DESCRIPTION OF THE DRAWINGS

FIG. 2B is a diagram showing an example for explaining the communication between the PLC and the CNC in a case of the CNC being unable to respond due to being an unresponsive timing, load on the bus or the like;

FIG. 5 is a diagram showing an example for explaining the communication processing of the numerical control system in a case of the CNC being unable to respond due to being an unresponsive timing, load on the bus or the like.

DETAILED DESCRIPTION OF THE INVENTION

Embodiment

First, an outline of the present embodiment will be described. In the present embodiment, the PLC transmits to an interface a special instruction (WINDW) in which the priority to be executed by the CNC is set.

The interface queues received special instructions, in a case of the CNC being unable to respond due to being an unresponsive timing, load on the bus or the like (e.g., "busy state"). In a case in which the CNC becomes able to respond, the interface sequentially notifies the CNC of the WINDW with higher priority among the queued WINDWs, and executes the instruction.

According to the present embodiment, with such a configuration, it is possible to solve the above-described problem of "to preferentially execute an instruction with higher priority in a case of the CNC being unable to respond due to being an unresponsive timing, load on the bus or the like".

The outline of the present embodiment is described above.

Next, a detailed description will be given of the configuration of the present embodiment with reference to the drawings.

Figure 3:
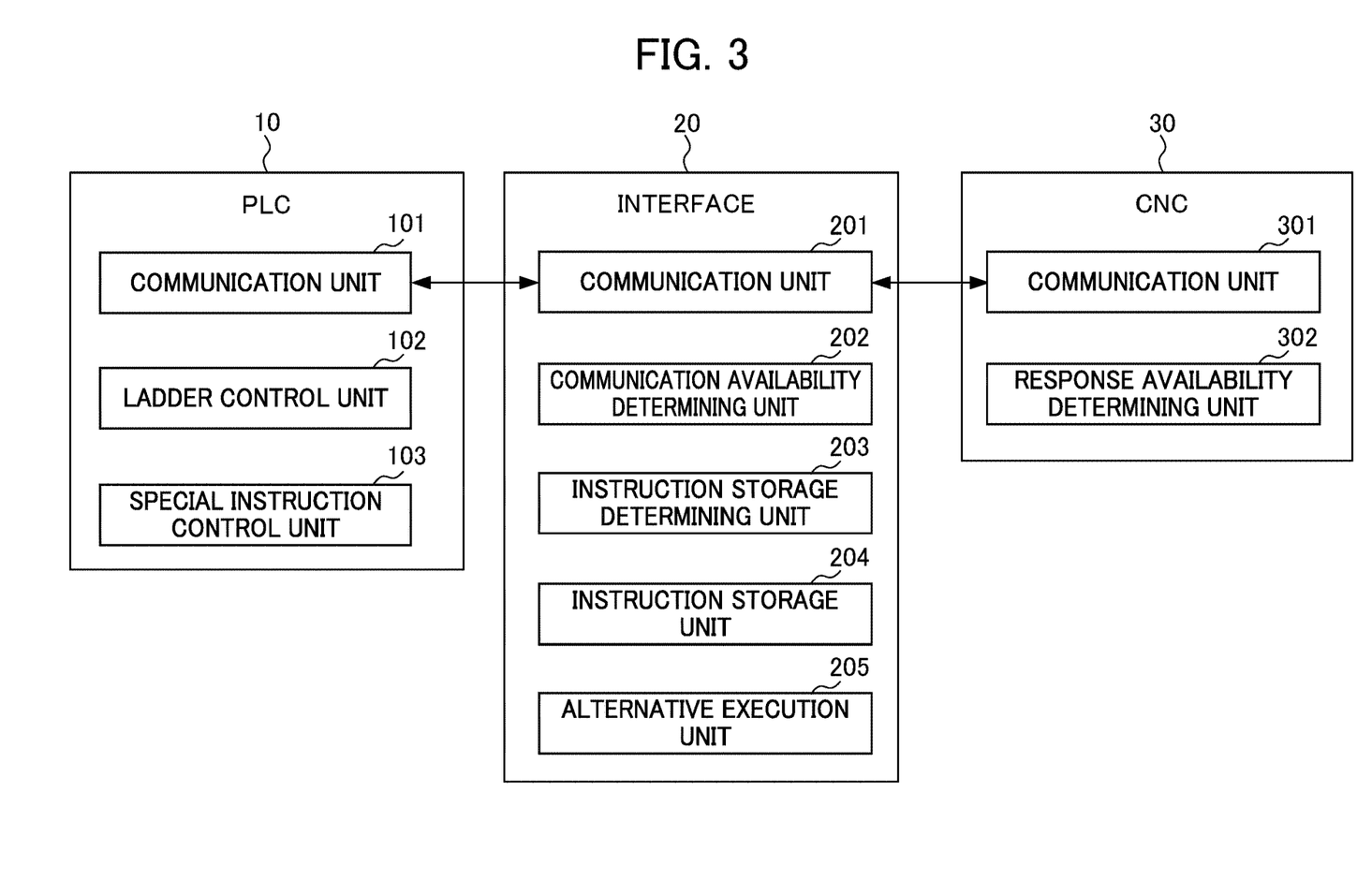
FIG. 3 is a diagram showing an example of the configuration of a numerical control system according to an embodiment.

FIG. 3 is a diagram showing an example of the configuration of a numerical control system according to the present embodiment. As shown in FIG. 3, the numerical control system includes a PLC 10, an interface 20, and a CNC 30. It should be noted that the interface 20 may be incorporated into the PLC 10 or the CNC 30.

The PLC 10, the interface 20, and the CNC 30 may be connected to each other via a bus. Furthermore, the PLC 10, the interface 20, and the CNC 30 may also be connected to each other via wires or wirelessly, or via a network (not shown), such as LAN (Local Area Network) or the Internet.

PLC 10

The PLC 10 is a PLC device known to a person skilled in the art which executes a sequence control program such as a ladder program and performs various kinds of control, arithmetic processing, input/output processing of signals, and the like according to the ladder program.

As shown in FIG. 3, the PLC 10 includes a communication unit 101, a ladder control unit 102, and a special instruction control unit 103.

The communication unit 101 controls communication with the interface 20.

The ladder control unit 102 interprets the ladder program and controls the input/output signal, for example, in accordance with the interpretation.

The special instruction control unit 103, for example, sets the priority degree indicating the degree of priority for executing the special instruction as an argument, in the special instruction of the WINDW executing the writing processing of various data as predetermined processing for the CNC 30 to be described later, on the basis of an instruction from the ladder control unit 102. The special instruction control unit 103 transmits the special instruction in which the priority is set to the interface 20.

It should be noted that the priority degree is set in advance so that it becomes higher with a smaller number and becomes lower with a larger number. However, the priority degree may be set so that it becomes higher with a larger number and becomes lower with a smaller number.

Furthermore, the priority degree may also be unique throughout the ladder program.

Figure 4:
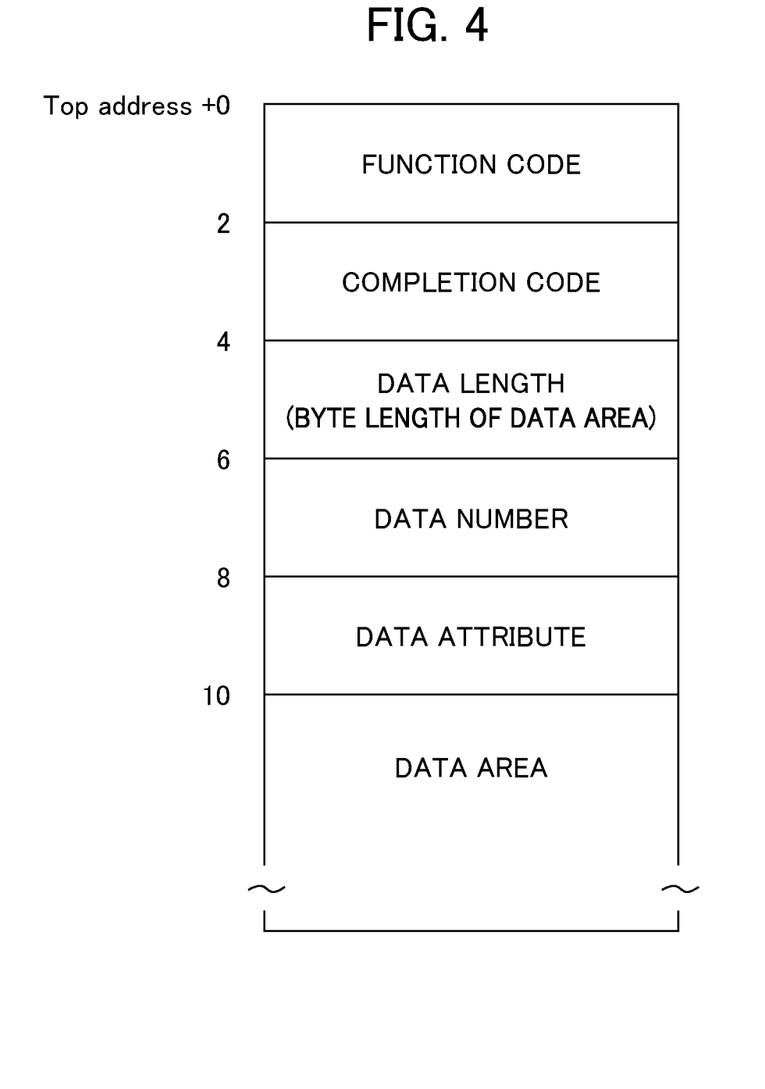
FIG. 4 is a diagram showing an example of the data included in the control data of the WINDW.

FIG. 4 is a diagram showing an example of the data included in the control data of the WINDW.

As shown in FIG. 4, the control data of the WINDW includes "function code", "completion code", "data length (byte length of the data area)", "data number", "data attribute", and "data area".

In the "function code", a code corresponding to the type of data desired to be written to the CNC 30 described later is set. The type of data includes, for example, CNC information, axis information, a tool life management function, and a tool management function.

Here, the CNC information includes writing of a tool offset amount, a work origin offset amount, a custom macro variable, etc. In addition, the axis information includes writing of torque limit data, preset of relative coordinates, three-dimensional error compensation data, etc. to the digital servo. In addition, the tool life management function includes tool life of the tool life management function data, writing of the tool life counter, tool number, etc.; registration of the tool group of the tool life management function data. In addition, the tool management function includes, for example, the replacement of tool management data numbers of magazine management tables, new registration of tool management, data, writing of tool management data, and the deletion of tool management data.

For example, the function code of "14" is set in advance for writing the "tool offset amount" of the CNC information, and the function code of "16" is set in advance for writing the "workpiece origin offset amount".

"0" indicating normal completion, "1" indicating error (error of function code), and "2" indicating error (error of data block length) are set in the "completion code".

For the "data length (byte length of the data area)", the data length of the data to be written in the CNC 30 described later may be set, for example.

For example, the axis number is set for the "data attribute". For example, when "0" is set, as the "data attribute", it indicates that no axis has been specified. Furthermore, in a case in which any value k from "1" to "n" is set as the "data attribute", it indicates that the k-th axis has been specified (n indicates an integer greater than or equal to 1, and k indicates an integer from 1 to n). In a case in which "−1" is set as the "data attribute", it indicates that all of the axes have been specified.

For example, data to be written to the CNC 30 described later is stored in the "data area".

Interface 20

The interface 20 is an interface which is known to those skilled in the art such as PCIe (Peripheral Component Interconnect Express), for example. The interface 20 relays communication between the PLC 10 and the CNC 30.

As shown in FIG. 3, the interface 20 includes a communication unit 201, a communication availability determining unit 202, an instruction storage determining unit 203, an instruction storage unit 204, and an alternative execution unit 205.

The communication unit 201 controls the communication with the PLC 10 and the communication with the CNC 30.

The communication availability determining unit 202, for example, determines whether or not the communication with the CNC 30 is possible on the basis of a notification indicating that the CNC 30 is unable to respond due to being an unresponsive timing, load on the bus or the like, by a response availability determining unit 302 of the CNC 30 to be described later. The communication availability determining unit 202 outputs a determination result to the instruction storage determining unit 203 and the alternative execution unit 205.

The instruction storage determining unit 203 determines whether or not to queue the instruction of the WINDW received from the PLC 10, on the basis of the determination result of the communication availability determining unit 202.

More specifically, the instruction storage determining unit 203 determines that the instruction of the WINDW received from the PLC 10 is queued in a case in which it is determined that the communication with the CNC 30 is not possible by the communication availability determining unit 202 due to a case of the CNC 30 being unable to respond due to being an unresponsive timing, load on the bus or the like. In this case, the instruction storage determining unit 203 stores the received WINDW Instruction in the instruction storage unit 204 described later.

The instruction storage unit 204, for example, is RAM (Random Access Memory) or the like, and sequentially stores the instructions of the WINDW received from the instruction storage determining unit 203.

The alternative execution unit 205, for example, notifies to the CNC 30 the instructions of the WINDW with higher priority in order, among the WINDWs stored in the instruction storing unit 204, in a case in which it is determined that the CNC 30 becomes able to execute the instruction and to respond by the communication availability determining unit 202, and executes the instruction.

CNC 30

The CNC 30 is a numerical control device known to those skilled in the art, and controls the operation of a machine tool (not shown). It should be noted that, in the present embodiment, the machine tool (not shown) can be widely applied to industrial machines in general. The industrial machines include, for example, machine tools, industrial robots, service robots, forging machines and injection molding machines. In addition, in a case in which the machine tool (not shown) is a robot, the CNC 30 includes a robot control device, etc.

As shown in FIG. 3, the CNC 30 includes a communication unit 301 and a response availability determining unit 302.

The CNC 30 includes an arithmetic processor (not shown) such as a CPU (Central Processing Unit) in order to realize the operation of the functional blocks of FIG. 3. The CNC 30 also includes an auxiliary storage device (not shown) such as ROM (Read Only Memory) or a HDD (Hard Disk Drive) which stores various kinds of control programs, and a main storage device (not shown) such as RAM which stores data that is temporarily required for the arithmetic processor to execute the programs.

In the CNC 30, the arithmetic processor reads the OS and application software from the auxiliary storage device, and expands the OS and application software thus read in the main storage device to perform arithmetic processing based on the OS or application software. The CNC 30 controls hardware components on the basis of the arithmetic processing result. In this way, the processing of the functional blocks shown in FIG. 3 is realized. In other words, the CNC 30 can be realized by the cooperation of hardware and software.

The communication unit 301 controls the communication with the interface 20, for example, in a case of the CNC 30 being unable to respond due to being an unresponsive timing, load on the bus or the like.

The response availability determining unit 302 determines whether the CNC 30 is unable to respond due to being an unresponsive timing, load on the bus or the like, due to heavy processing such as axis replacement. In a case in which it is determined as a case of the CNC being unable to respond due to being an unresponsive timing, load on the bus or the like, and when the command of the WINDW is received from the interface 20, the response availability determining unit 302 transmits to the interface 20 a notification indicating that the CNC is unable to respond.

Communication Processing During Busy Condition of Numerical Control System

Next, a description will be given of the operation relating to the communication processing of the numerical control system according to the present embodiment in a case of the CNC 30 being unable to respond due to being an unresponsive timing, load on the bus or the like.

Figure 5:
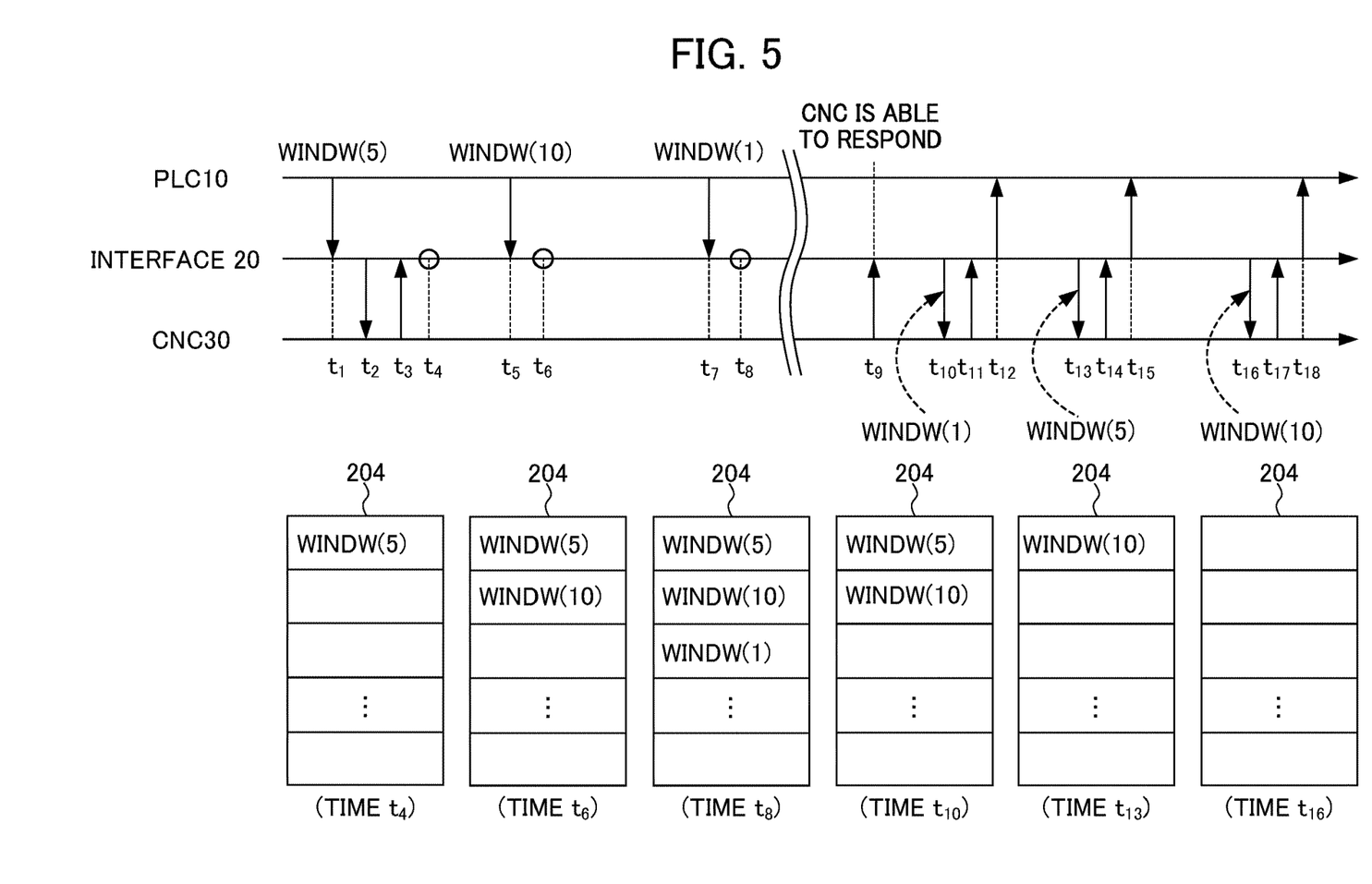

FIG. 5 is a diagram showing an example for explaining communication processing of a numerical control system in a case of the CNC 30 being unable to respond due to being an unresponsive timing. The upper part of FIG. 5 shows the time series of communication among the PLC 10, the interface 20, and the CNC 30. The lower part of FIG. 5 shows the state of the instruction storage unit 204 of the interface 20 at times $t_4$, $t_6$, $t_8$, $t_{10}$, $t_{13}$, and $t_{16}$.

At time $t_1$, the special instruction control unit 103 of the PLC 10 transmits the WINDW in which the priority degree "5" is set (hereinafter, also referred to as "WINDW (5)") to the interface 20.

At time $t_2$, the communication availability determining unit 202 of the interface 20 determines that the communication with CNC30 is possible, since the communication availability determining unit 202 has not received a notification from the response availability determining unit 302 of the CNC 30 indicating that the CNC 30 is unable to respond due to being an unresponsive timing, load on the bus or the like. Then, the communication unit 201 notifies the CNC 30 of a command by the WINDW (5) received from the PLC 10.

At time $t_3$, the response availability determining unit 302 of the CNC 30 transmits to the interface 20 the notification from the response availability determining unit 302 of the CNC 30 indicating that the CNC 30 is unable to respond due to being an unresponsive timing, load on the bus or the like, in response to the command notified from the interface 20.

Since the communication availability determining unit 202 of the interface 20 receives the notification indicating that the CNC 30 is unable to respond due to being an unresponsive timing, load on the bus or the like, the communication availability determining unit 202 determines that the communication with the CNC 30 is not possible.

At time $t_4$, the instruction storage determining unit 203 of the interface 20 determines to queue the WINDW(5) on the basis of the determination result of the communication availability determining unit 202, and stores the WINDW(5) in the instruction storage unit 204.

At time $t_5$, the special instruction control unit 103 of the PLC 10 transmits the WINDW in which the priority degree "10" is set (hereinafter, also referred to as "WINDW(10)") to the interface 20.

At time $t_6$, since the communication availability determining unit 202 of the interface 20 has not received the notification indicating that the CNC 30 becomes able to respond from the response availability determining unit 302 of the CNC 30, the communication availability determining unit 202 determines that the communication with the CNC 30 is not possible. The instruction storage determining unit 203 determines to queue the WINDW(10), and stores the WINDW(10) in the instruction storage unit 204, on the basis of the determination result of the communication availability determining unit 202.

At time $t_7$, the special instruction control unit 103 of the PLC 10 transmits the WINDW in which the priority degree "1" is set (hereinafter, also referred to as "WINDW(1)") to the interface 20.

At time $t_8$, since the communication availability determining unit 202 of the interface 20 has not received the notification indicating that the CNC 30 becomes able to respond from the response availability determining unit 302 of the CNC 30, the communication availability determining unit 202 determines that the communication with the CNC 30 is not possible. The instruction storage determining unit 203 determines to queue the WINDW(1), and stores the WINDW(1) in the instruction storage unit 204, on the basis of the determination result of the communication availability determining unit 202.

At time $t_9$, in a case in which the CNC 30 becomes able to respond, the response availability determining unit 302 of the CNC 30 transmits to the interface 20 the notification indicating that the CNC 30 is able to respond.

The communication availability determining unit 202 of the interface 20 determines that the communication with the CNC 30 is possible, upon receiving the notification indicating that the CNC 30 can respond.

At time $t_{10}$, the alternative execution unit 205 of the interface 20 reads the WINDW(1) having the highest priority among the WINDWs stored in the instruction storage unit 204, and notifies the CNC 30 of the command by the WINDW(1).

Thereafter, the CNC 30 executes the command of the WINDW(1) notified from the interface 20.

At time the communication unit 301 of the CNC 30 transmits a notification indicating that the execution of the command of the WINDW(1) is completed to the interface 20.

At time $t_{12}$, the communication unit 201 of the interface 20 transmits a notification to the PLC 10 indicating that the execution of the WINDW (1) is completed.

At time $t_{13}$, the alternative execution unit 205 of the interface 20 reads the WINDW(5) having the highest priority among the WINDWs stored in the instruction storage unit 204, and notifies the CNC 30 of the command by the WINDW(5).

Thereafter, the CNC 30 executes the command of the WINDW(5) notified from the interface 20.

At time $t_{14}$, the communication unit 301 of the CNC 30 transmits a notification indicating that the execution of the WINDW(5) command is completed to the interface 20.

At time $t_{15}$, the communication unit 201 of the interface 20 transmits a notification to the PLC 10 indicating that the execution of the WINDW(5) is completed.

At time $t_{16}$, the alternative execution unit 205 of the interface 20 reads the WINDW(10) having the highest priority among the WINDWs stored in the instruction storage unit 204, and notifies the CNC 30 of the command by the WINDW(1).

Thereafter, the CNC 30 executes the command of the WINDW(10) notified from the interface 20.

At time $t_{17}$, the communication unit 301 of the CNC 30 transmits a notification indicating that the execution of the command of the WINDW(10) is completed to the interface 20.

At time $t_{18}$, the communication unit 201 of the interface 20 transmits a notification to the PLC 10 indicating that the execution of the WINDW (10) is completed.

As described above, the PLC 10 according to one embodiment transmits to the interface 20 a special instruction of the WINDW in which the priority degree for executing the processing is set. The interface 20 queues the WINDW received from the PLC 10 in a case of the CNC 30 being unable to respond due to being an unresponsive timing, load on the bus or the like. In a case in which the CNC 30 becomes able to respond, the interface 20 causes the CNC 30 to execute the WINDW with higher priority in order from among the queued WINDWs. With such a configuration, it is possible for the PLC 10 to preferentially execute an instruction with higher priority at a stage detecting that the CNC 30 is unable to respond due to being an unresponsive timing, the load of the bus, etc.

In addition, the PLC 10 will be able to construct programs that are easier to control, taking into account the status of the CFC 30 and the importance of peripheral devices.

Although one embodiment has been described, the PLC 10 is not limited to the above embodiment, and includes modifications, improvements, etc. of an extent that the object of the present invention can be achieved.

Modification Example 1

In the above-described embodiment, although the interface 20 is an independent device from the PLC 10 and the CNC 30, the interface 20 may be incorporated into the PLC 10 or the CNC 30.

Furthermore, the PLC 10 and the CNC 30 may communicate directly with each other without going through the interface 20. In this case, the PLC 10 may have at least the instruction storage determining unit 203 and the instruction storage unit 204.

It should be noted that each function included in the PLC 10, the interface 20, and the CNC 30 according to the embodiment can respectively be implemented by hardware, software, or a combination thereof. Herein, being realized by software indicates being realized by a computer reading and executing a program.

The programs can be stored on any of various types of non-transitory computer readable media and be provided to a computer. The non-transitory computer readable media include various types of tangible storage media. Examples of non-transitory computer readable media include magnetic recording media (e.g., flexible disks, magnetic tapes, hard disk drives), magneto-optical media (e.g., magneto-optical disks), CD-ROM (Read Only Memory), CD-R, CD-R/W, semiconductor memory (e.g., mask ROM, PROM (Programmable ROM), EPROM (Erasable PROM), flash ROM, RAM). In addition, the programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical wire, optical fiber or the like, or a wireless communication path.

A step of writing programs to be recorded on a recording medium includes processing that is performed in a time series manner according to the order and processing that is performed in a parallel or independent manner even if the processing is not necessarily performed in a time series manner.

In other words, the PLC device of the present disclosure can assume various embodiments having the following configurations.

(1) A PLC device (the PLC 10) according to the present disclosure includes: a special instruction control unit 103 that sets a priority degree indicating a degree of priority for executing predetermined processing to a special instruction (WINDW) for performing the predetermined processing in a control device (the CNC 30) that controls an industrial machine, and transmits the special instruction in which the priority degree is set to the control device; an instruction storage determining unit 203 that determines whether or not to queue the special instruction according to an operation state of the control device; and an instruction storage unit 204 that sequentially stores the special instruction received, on the basis of a determination result of the instruction storage determining unit 203.

According to this PLC device, even in a case of the CNC 30 being unable to respond due to being an unresponsive timing, load on the bus or the like, it is possible to preferentially execute an instruction with higher priority.

(2) Communication with the control device may be performed via an interface 20, and the interface 20 may include: the instruction storage determining unit 203; the instruction storage unit 204; and an alternative execution unit 205 that, in a case in which the control device becomes able to respond, causes the control device to execute a special instruction with higher priority of the priority degree in order from among the special instructions stored in the instruction storage unit 204.

This allows for efficient communication between the PLC 10 and the interface 20 and between the interface 20 and the CNC 30.

(3) The priority degree may be unique for each of the special instructions.

In so doing, one command of the WINDW according to the priority degree can be notified to the CNC 30.

EXPLANATION OF REFERENCE NUMERALS

10 PLC
103 special instruction control unit
20 interface
203 instruction storage determining unit
204 instruction storage unit
205 alternative execution unit
30 CNC

What is claimed is:

1. A PLC device comprising:
a ladder control unit that interprets a ladder program and controls an input/output signal in accordance with the interpretation;
a special instruction control unit that sets, on the basis of an instruction from the ladder control unit, a priority degree indicating a degree of priority for executing predetermined processing to a special instruction for performing the predetermined processing in a control device that controls an industrial machine, the priority degree being set as an argument in the special instruction, and transmits the special instruction in which the priority degree is set to the control device, the control device being a computerized numerical control (CNC) device different from the PLC device;
an instruction storage determining unit that determines whether or not to queue the special instruction according to an operation state of the control device, the operation state indicating that communication with the control device is not possible due to the control device being unable to respond; and
an instruction storage unit that sequentially stores the special instruction transmitted by the special instruction control unit, on the basis of a determination result of the instruction storage determining unit.

2. The PLC device according to claim 1, wherein communication with the control device is performed via an interface, and
the interface includes:
the instruction storage determining unit;
the instruction storage unit; and
an alternative execution unit that, in a case in which the control device becomes able to respond, causes the control device to execute a special instruction with higher priority of the priority degree in order from among the special instructions stored in the instruction storage unit.

3. The PLC device according to claim 1, wherein the priority degree is unique for each of the special instructions.

* * * * *